(12) United States Patent
Yang et al.

(10) Patent No.: US 8,373,399 B2
(45) Date of Patent: Feb. 12, 2013

(54) CONTROL CIRCUIT OF INTERLEAVED PFC POWER CONVERTER

(75) Inventors: Ta-Yung Yang, Milpitas, CA (US); Cheng-Sung Chen, Taichung County (TW); Rui-Hong Lu, Chiayi County (TW)

(73) Assignee: System General Corp., Taipei Hsien (TW)

( * ) Notice: Subject to any disclaimer, the term of this patent is extended or adjusted under 35 U.S.C. 154(b) by 285 days.

(21) Appl. No.: 12/915,563

(22) Filed: Oct. 29, 2010

(65) Prior Publication Data

US 2012/0001600 A1    Jan. 5, 2012

(30) Foreign Application Priority Data

Jul. 1, 2010 (CN) .......................... 2010 1 0220566

(51) Int. Cl.
*G05F 1/00* (2006.01)
(52) U.S. Cl. ...................................... 323/272; 323/207
(58) Field of Classification Search .................. 323/207, 323/272, 283; 363/72
See application file for complete search history.

(56) References Cited

U.S. PATENT DOCUMENTS

| 8,207,711 B2* | 6/2012 | Crawford et al. ............. 323/207 |
| 8,248,041 B2* | 8/2012 | Rausch et al. ................ 323/207 |
| 2010/0097828 A1 | 4/2010 | Chen |

FOREIGN PATENT DOCUMENTS

CN    101728953 A    6/2010

* cited by examiner

*Primary Examiner* — Shawn Riley
(74) *Attorney, Agent, or Firm* — Rosenberg, Klein & Lee (57) ABSTRACT

A control circuit of an interleaved PFC power converter according to the present invention comprises a master switching control circuit, a slave switching control circuit, and a slave reference signal generator. The master switching control circuit generates a control signal and a first switching signal in response to an input voltage and a feedback signal. The first switching signal is utilized to control a first switch of the PFC power converter. The slave reference signal generator generates a slave control signal in response to a load condition of the PFC power converter and the control signal. The slave switching control circuit generates a second switching signal in response to the slave control signal. The slave control signal is utilized to control a second switch of the PFC power converter. The slave reference signal generator adjusts the control signal in response to the load condition for generating the slave control signal correspondingly. The slave control signal drives the slave switching control circuit to adjust the switching frequency of the second switch for reducing the switching loss.

11 Claims, 7 Drawing Sheets

CONTROL CIRCUIT OF INTERLEAVED PFC POWER CONVERTER

BACKGROUND OF THE INVENTION

1. Field of the Invention

The present invention relates to power converters, and, more specifically, the present invention relates to the control circuit of an interleaved PFC power converter.

2. Description of Related Art

Nowadays power converters outputting more than 75 W take advantage of Power Factor Correction (PFC) to improve power factor of AC power and to improve efficacy. To improve efficacy, a new PFC correction circuit has been proposed, wherein the Interleaved PFC power converter with master/slave switching control circuits is the emphasis of current development.

Figure 1:
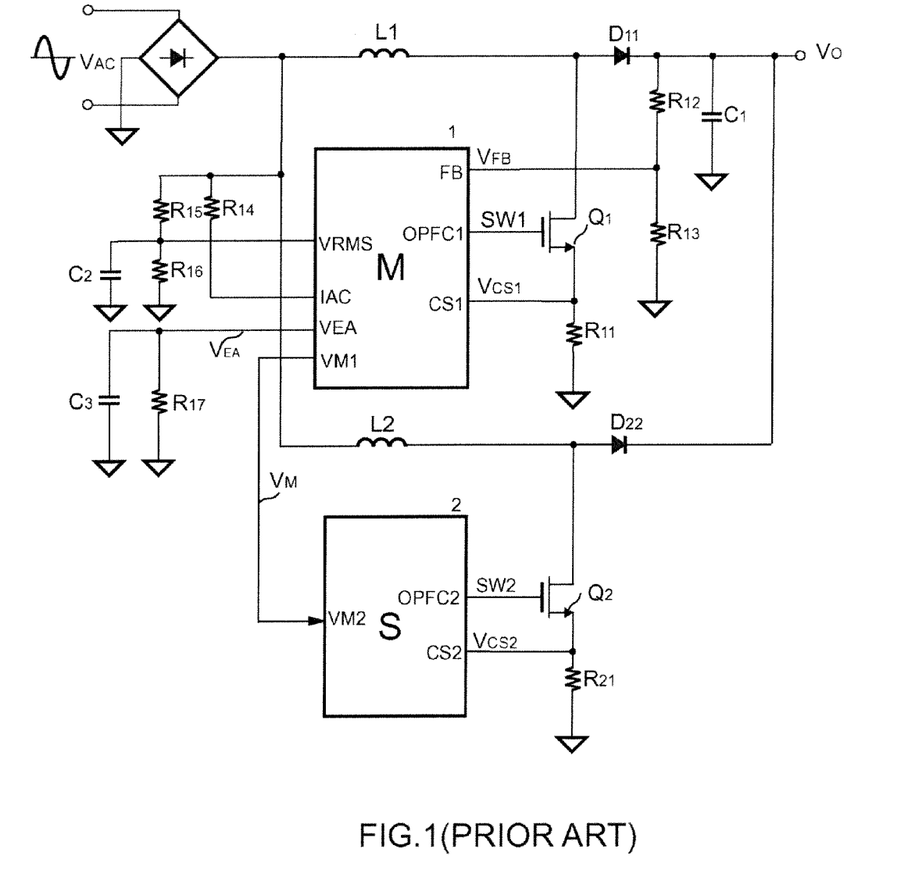
FIG. 1 shows a schematic circuit diagram of the conventional interleaved PFC power converter with master/slave switching control circuits.

Referring to FIG. 1, it shows a schematic circuit of the conventional Interleaved PFC power converter with master/slave switching control circuits. As shown in FIG. 1, the control circuit at least includes a master switching control circuit (M) 1 and a slave switching control circuit (S) 2. When a first switch $Q_1$ coupled to the magnetic component L1 is controlled by the master switching control circuit 1 and turned off, a current through the magnetic component L1 is rectified by the rectifier $D_{11}$ and then stored in a capacitor $C_1$. Meanwhile, When a second switch $Q_2$ coupled to the magnetic component L2 is controlled by the slave switching control circuit 2 and turned off, a current through the magnetic component L2 is rectified by the rectifier $D_{22}$ and then is stored in the capacitor $C_1$. The energy (the current) stored in the capacitor $C_1$ is utilized as an output voltage $V_O$.

The operation of the Interleaved PFC power converter with master/slave switching control circuits is described as follow: the magnetic component L1 receives a voltage that is obtained by rectifying the input voltage $V_{AC}$. The master switching control circuit 1 respectively generates a control signal $V_M$ and a first switching signal SW1 at a VM1 terminal and an output terminal OPFC1 in response to the signals received by VRMS terminal, IAC terminal, feedback terminal FB, current sensing terminal CS1 and VEA terminal (e.g. feedback signal $V_{FB}$, current sensing signal $V_{CS1}$ and error signal $V_{EA}$ ... etc). The signal received by the VRMS terminal is the voltage that is established on the capacitor $C_2$. The voltage is established on the capacitor $C_2$ after the input voltage $V_{AC}$ is rectified and the rectified input voltage $V_{AC}$ is divided by a voltage divider (that consists of resistance components $R_{15}$ and $R_{16}$). The signal received by the IAC terminal is a voltage that is obtained by decaying the rectified input voltage $V_{AC}$ through the resistance component $R_{14}$. A RC compensation circuit (that consists of the resistance components $R_{17}$ and capacitor $C_3$) is connected between the VEA terminal and a ground terminal to generate the error signal $V_{EA}$.

The signal received by the VRMS terminal correlates to the input voltage $V_{AC}$; the signal received by the IAC terminal correlates to an input current. When the load coupled to the PFC power converter decreases, the feedback signal $V_{FB}$ increases and the error signal $V_{EA}$ decreases. Therefore, the error signal $V_{EA}$ correlates to the load condition (how heavy the load is). The control signal $V_M$ is utilized to control the input current to follow the input voltage $V_{AC}$ to reach a high power factor. The first switching signal SW1 controls a first switch $Q_1$.

When the first switch $Q_1$ is controlled by the first switching signal SW1 and turned on, the current sensing signal $V_{CS1}$ is generated at a resistance component $R_{11}$ in response to the current through the magnetic component L1. The resistance component $R_{11}$ is coupled to the first switch $Q_1$ the first switch $Q_1$ is controlled by the master switching control circuit 1 and turned off, the current through the magnetic component L1 is rectified by the rectifier $D_{11}$ and then is stored in the capacitor $C_1$. Moreover, the feedback signal $V_{FB}$ is generated by dividing the output voltage $V_O$ through a voltage divider that consists of the resistance components $R_{12}$ and $R_{13}$. The feedback signal $V_{FB}$ is coupled to the feedback terminal FB.

The magnetic component L2 receives the voltage that is obtained by rectifying the input voltage $V_{AC}$. The slave switching control circuit 2 generates a second switching signal SW2 at an output terminal OPFC2 of the slave switching control circuit 2 in response to the control signal $V_M$ and a current sensing signal $V_{CS2}$ received by a VM2 terminal and a current sensing terminal CS2 of the slave switching control circuit 2. The second switching signal SW2 controls the second switch $Q_2$ coupled to the magnetic component L2. When the second switch $Q_2$ is controlled by the second switching signal SW2 and turned on, the current sensing signal $V_{CS2}$ is generated at a resistance component $R_{21}$ in response to the current through the magnetic component L2. The resistance component $R_{21}$ is coupled to the second switch $Q_2$. When the second switch $Q_2$ is controlled by the second switching signal SW2 and turned off, the current through the magnetic component L2 is rectified by the rectifier $D_{22}$ and then is stored in the capacitor $C_1$.

Figure 2:
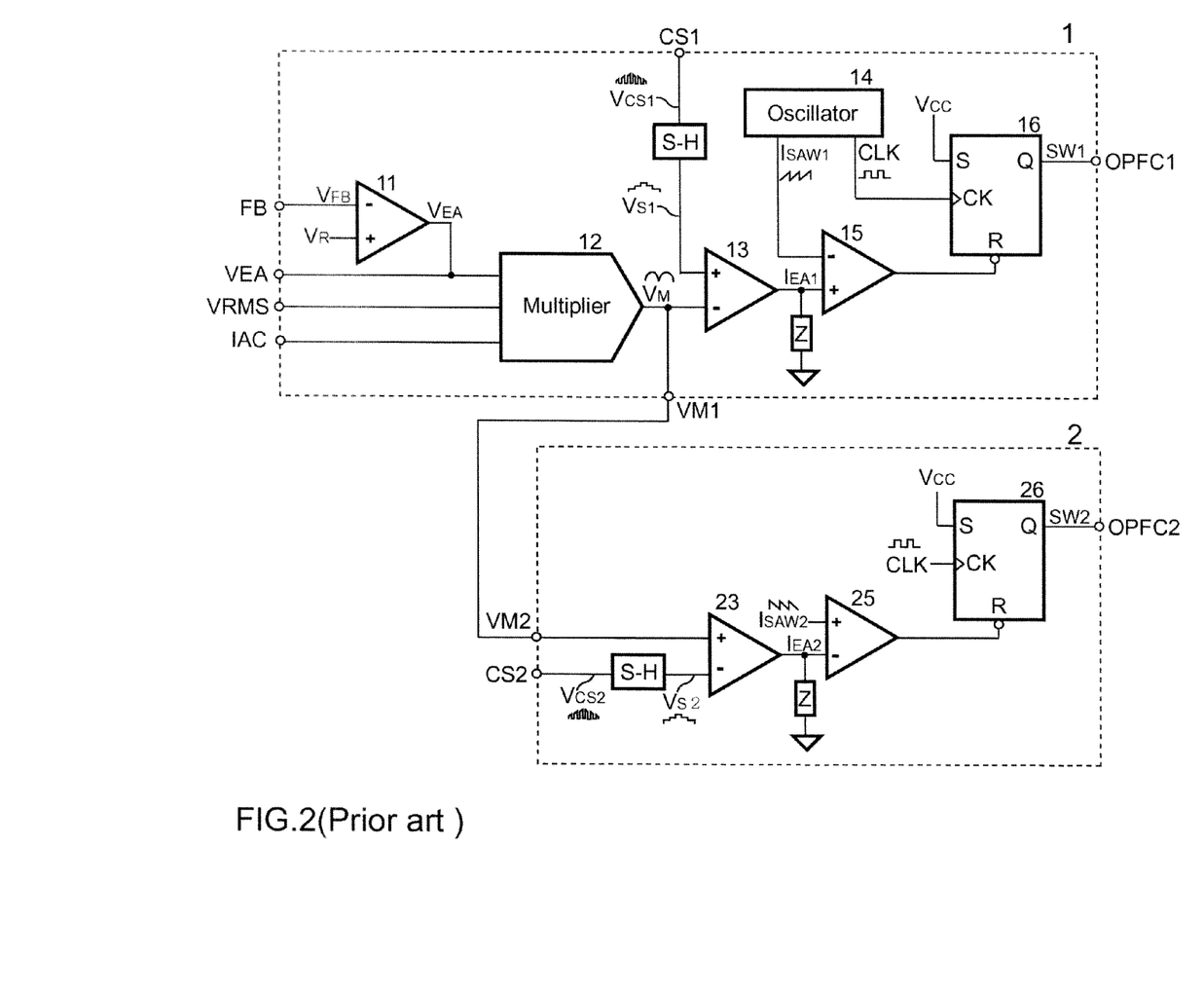
FIG. 2 shows a schematic circuit diagram of the master/slave switching control circuits of the conventional interleaved PFC power converter.

Referring to FIG. 2, it shows a schematic circuit of the master/slave switching control circuits of the conventional interleaved PFC power converter with master/slave switching control circuits. Also referring to FIG. 1, the positive/negative input terminals of a voltage error amplifier 11 of the master switching control circuit 1 respectively receive a reference signal $V_R$ and the feedback signal $V_{FB}$. The output terminal of the voltage error amplifier 11 is coupled to the VEA terminal of the master switching control circuit 1 to generate the error signal $V_{EA}$. A multiplier 12 is coupled to the VEA terminal, the VRMS terminal and the IAC terminal of the master switching control circuit 1 to generate the control signal $V_M$. It is a conventional technology that the multiplier 12 generates the control signal $V_M$, so here it can be omitted.

A current error amplifier 13, a comparator 15 and a sample-hold circuit S-H form a current feedback compensation circuit. The control signal $V_M$ is coupled to the negative input terminal of the current error amplifier 13 and to the VM1 terminal of the master switching control circuit 1. The positive input terminal of the current error amplifier 13 receives a signal $V_{S1}$. The signal $V_{S1}$ is generated by the sample-hold circuit S-H sampling the current sensing signal $V_{CS1}$. The current error amplifier 13 generates a signal $I_{EA1}$ in response to the signal $V_{S1}$ and the control signal $V_M$. The signal $I_{EA1}$ is coupled to the positive input terminal of the comparator 15. The negative input terminal of the comparator 15 receives a first saw signal $I_{SAW1}$ generated by an oscillator 14. The output terminal of the comparator 15 is coupled to the rest terminal R of a flip-flop 16.

The set terminal S and the clock terminal CK of the flip-flop 16 respectively receive an input power $V_{CC}$ and a clock signal CLK generated by the oscillator 14. The output terminal Q of the flip-flop 16 is coupled to the output terminal OPFC1 of the master switching control circuit 1 and outputs the first switching signal SW1. The reset terminal R of the flip-flop 16 is controlled by the output terminal of the comparator 15 through a NOT gate. The output terminal of the comparator 15 controls the disabling of the first switching signal SW1 in response to the first saw signal $I_{SAW1}$ and the signal $I_{EA1}$. Therefore, when the control signal $V_M$ is changed with the adjustment of the load, the output of the comparator 15 will react immediately to control the pulse width of the first switching signal SW1.

Continuously referring to FIG. 2, a current error amplifier 23, a comparator 25 and a sample-hold circuit S-H form a current feedback compensation circuit of the slave switching control circuit 2. The VM2 terminal of the slave switching control circuit 2 is coupled to the VM1 terminal of the master switching control circuit 1 to receive the control signal $V_M$. Therefore, when the control signal $V_M$ is generated, the positive input terminal of the current error amplifier 23 will receive the control signal $V_M$ through the VM2 terminal of the slave switching control circuit 2. The negative input terminal of the current error amplifier 23 receives a signal $V_{S2}$. The signal $V_2$ is generated by the sample-hold circuit S-H of the slave switching control circuit 2 sampling the current sensing signal $V_{CS2}$. The negative input terminal of the current error amplifier 23 is coupled to the CS2 terminal of the slave switching control circuit 2 through the sample-hold circuit S-H to receive the current sensing signal $V_{CS2}$. The output terminal of the current error amplifier 23 generates the signal $I_{EA2}$ in response to the control signal $V_M$ and the signal $V_{S2}$.

The positive input terminal and the negative input terminal of the comparator 25 respectively receive a second saw signal $I_{SAW2}$ and the signal $I_{EA2}$. The set terminal S and the clock terminal CK of the flip-flop 26 respectively receive the input power $V_{CC}$ and the clock signal CLK. The output terminal Q of the flip-flop 26 is coupled to the output terminal OPFC2 of the slave switching control circuit 2 and outputs the second switching signal SW2. The reset terminal R of the flip-flop 26 is controlled by the output terminal of the comparator 25 through a NOT gate. The output terminal of the comparator 25 controls the disabling of the second switching signal SW2 in response to the second saw signal $I_{SAW2}$ and the signal $I_{EA2}$. Wherein, when the control signal $V_M$ is changed, the output of the comparator 25 will react immediately to adjust the pulse width of the second switching signal SW2 simultaneously.

The feature of the conventional interleaved PFC power converter with master/slave switching control circuits is that the master switching control circuit 1 and the slave switching control circuit 2 individually control a half output power of the power converter. Therefore, the switching frequency of the first switch $Q_1$ and the second switch $Q_2$ are the same. However, a new standard of efficacy asks that the power converter provides higher system efficacy. Therefore, when the load is light, the new standard of efficacy can be reached by reducing the switching loss of the switch to upgrade the efficacy and it is also the emphasis of the current development of the interleaved PFC power converter with master/slave switching control circuits.

SUMMARY OF THE INVENTION

It is an objective of the present invention to provide a control circuit with a slave reference signal generator. It can be applied for the interleaved PFC power converter with the master/slave switching control circuits. In a hysteresis range of a light load, the invention controls the second switch controlled by the slave switching control circuit gradually reducing the switching frequency and finally turning off in response to the reduction of the load. Therefore, reducing the switching loss of the switch is for the purpose of increasing efficacy.

The control circuit of the interleaved PFC power converter according to the present invention comprises a master switching control circuit, a slave switching control circuit and a slave reference signal generator. The master switching control circuit generates a control signal and a first switching signal in response to an input voltage and a feedback signal. The first switching signal is utilized to control a first switch of the PFC power converter. The slave reference signal generator generates a slave control signal in response to a load condition of the PFC power converter and the control signal. The slave switching control circuit generates a second switching signal in response to the slave control signal to control a second switch of the PFC power converter.

The slave reference signal generator adjusts the control signal in response to the load condition to generate the slave control signal. The slave control signal controls the slave switching control circuit to reduce gradually the switching frequency of the second switch for reducing the switching loss when the load is in the hysteresis range of the light load.

BRIEF DESCRIPTION OF THE DRAWINGS

The invention can be more fully understood by reading the subsequent detailed description and examples with references made to the accompanying drawings, wherein.

DESCRIPTION OF THE PREFERRED EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 3:
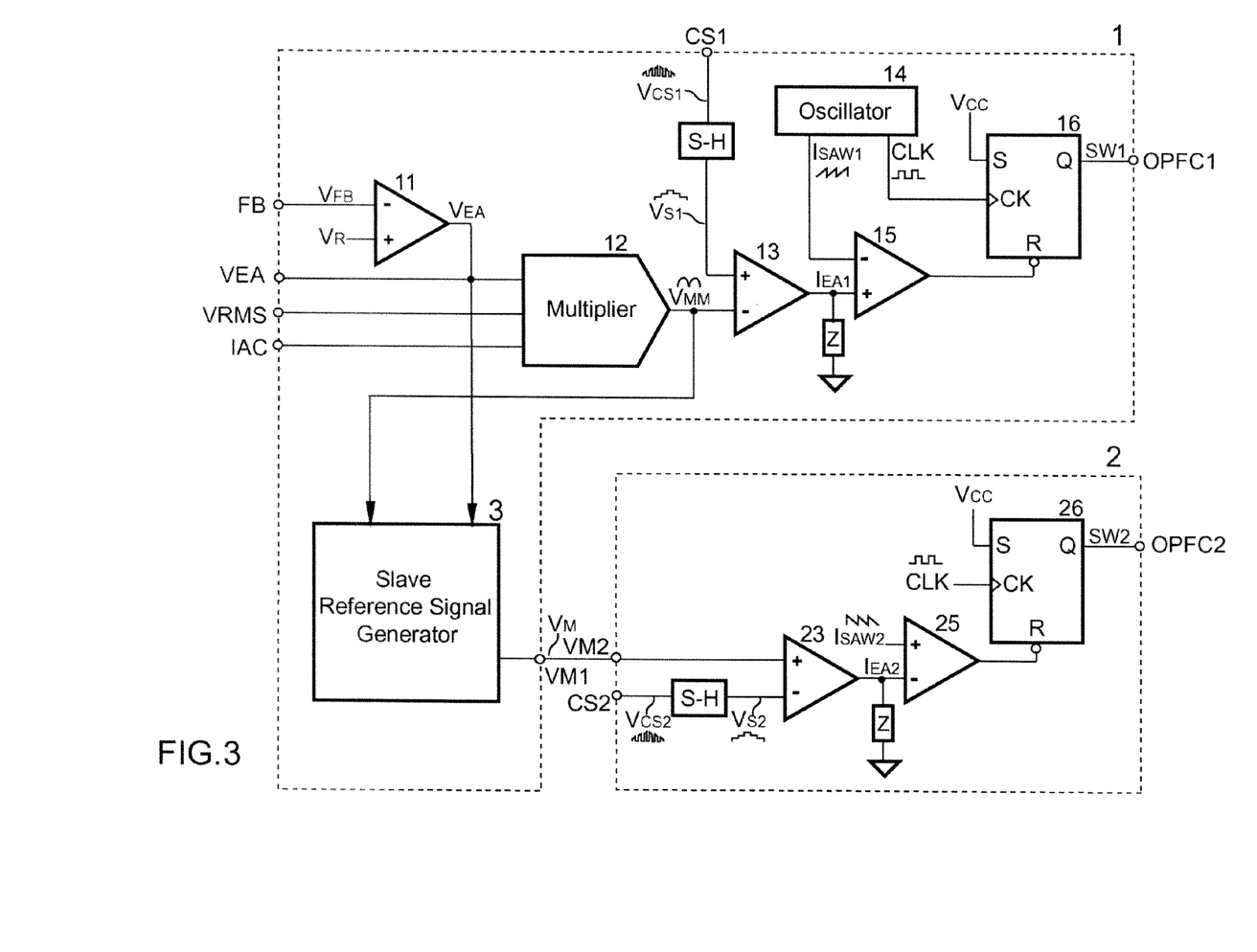
FIG. 3 shows a schematic circuit diagram of a embodiment of a control circuit of the interleaved PFC power converter with master/slave switching control circuits according to the present invention.

FIG. 3 shows a schematic circuit diagram of a embodiment of a control circuit of the interleaved PFC power converter with master/slave switching control circuits according to the present invention. Besides the master switching control circuit 1 and the slave switching control circuit 2 in FIG. 2, the control circuit of the present invention adds a slave reference signal generator 3. The control circuit of the present invention includes the master switching control circuit 1, the slave switching control circuit 2 and the slave reference signal generator 3. In this embodiment, the slave reference signal generator 3 is designed in the master switching control circuit 1, but practically, the slave reference signal generator 3 can be designed in the slave switching control circuit 2 or as an independent circuit and it only needs to be coupled to the master switching control circuit 1 and the slave switching control circuit 2.

Continuously referring to FIG. 3, a multiplier 12 of the master switching control circuit 1 generates a control signal $V_{MM}$ in response to the error signal $V_{EA}$. The slave reference signal generator 3 adjusts the control signal $V_{MM}$ in response to the error signal $V_{EA}$ for generating a slave control signal $V_M$. The error signal $V_{EA}$ correlates to a load condition. In the other word, the slave reference signal generator 3 adjusts the control signal $V_{MM}$ in response to the load condition (the error signal $V_{EA}$) for generating the slave control signal $V_M$. This control signal $V_{MM}$ is the same as the control signal $V_M$ generated by the multiplier 12 in FIG. 2. The slave control signal $V_M$ generated by the slave reference signal generator 3 is coupled to the slave switching control circuit 2. The slave control signal $V_M$ is outputted from the VM1 terminal of the master switching control circuit 1 to the VM2 terminal of the slave switching control circuit 2. Therefore, the slave switching control circuit 2 will adjust the switching frequency of the second switching signal SW2 and the switching frequency of the second switch $Q_2$ in response to the slave control signal $V_M$.

Figure 4:
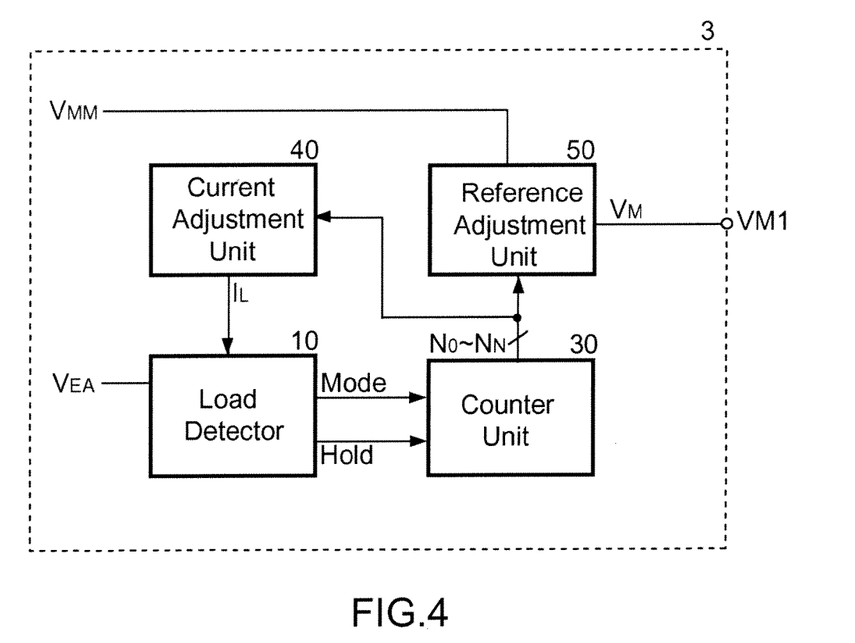
FIG. 4 shows a schematic circuit diagram of a embodiment of a slave reference signal generator according to the present invention.

FIG. 4 shows a schematic circuit diagram of a embodiment of the slave reference signal generator 3 according to the present invention. As shown in FIG. 4, the slave reference signal generator 3 adjusts the control signal $V_{MM}$ in response to the error signal $V_{EA}$ to generate the slave control signal $V_M$. The slave reference signal generator 3 includes a load detector 10, a counter unit 30, a current adjustment unit 40 and a reference adjustment unit 50.

The load detector 10 is used to detect the load condition of the PFC power converter in response to the error signal $V_{EA}$ correlated to the load and generates a detection signal. The detection signal includes a Mode signal and a Hold signal. The counter unit 30 is coupled to the load detector 10, and counts to generate counter signals $N_0 \sim N_N$ in response to the Mode signal and the Hold signal. When the load condition is not in predetermined hysteresis rage of light load (e.g. the load is heavy load), the counter unit 30 is controlled by the Hold signal and stops counting, wherein the counter signals $N_0 \sim N_N$ maintains a high level. When the load condition is in the predetermined hysteresis rage of light load, the counter unit 30 starts up count or down count in response to the Mode signal, and correspondingly generates the counter signals $N_0 \sim N_N$. When the load condition is in the predetermined hysteresis rage of light load and the load is getting lighter, the counter unit 30 starts the down count; when the load condition is in the predetermined hysteresis rage of light load and the load is getting heavier, the counter unit 30 starts the up count.

The current adjustment unit 40 is coupled to the counter unit 30 and adjusts an adjustment current $I_L$ in response to the counter signals $N_0 \sim N_N$. The reference adjustment unit 50 is coupled to the counter unit 30 and adjusts the control signal $V_{MM}$ in response to the counter signals $N_0 \sim N_N$ to generate the slave control signal $V_M$. The slave control signal $V_M$ is coupled to the slave switching control circuit 2 (as shown in FIG. 3) through the VM1 terminal to control the switching frequency of the second switch $Q_2$ (as shown in FIG. 1). The load detector 10 will adjust the level of the detection signal in response to the adjustment current $I_L$ and the load condition that is adjusting the level of the Mode signal and the level of the Hold signal.

Figure 5A:
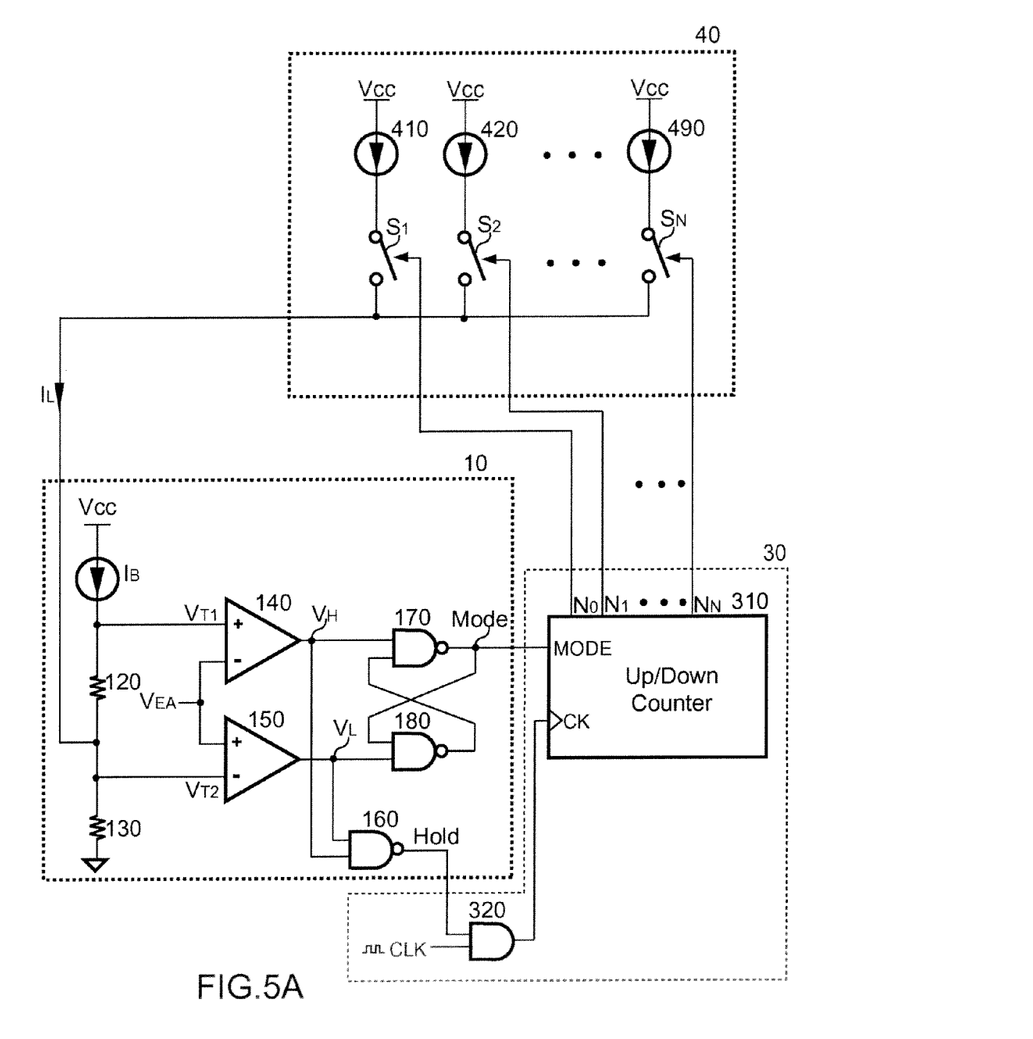
FIG. 5A shows a schematic circuit diagram of a embodiment of a load detector, a counter unit and a current adjustment unit according to the present invention.
Figure 5B:
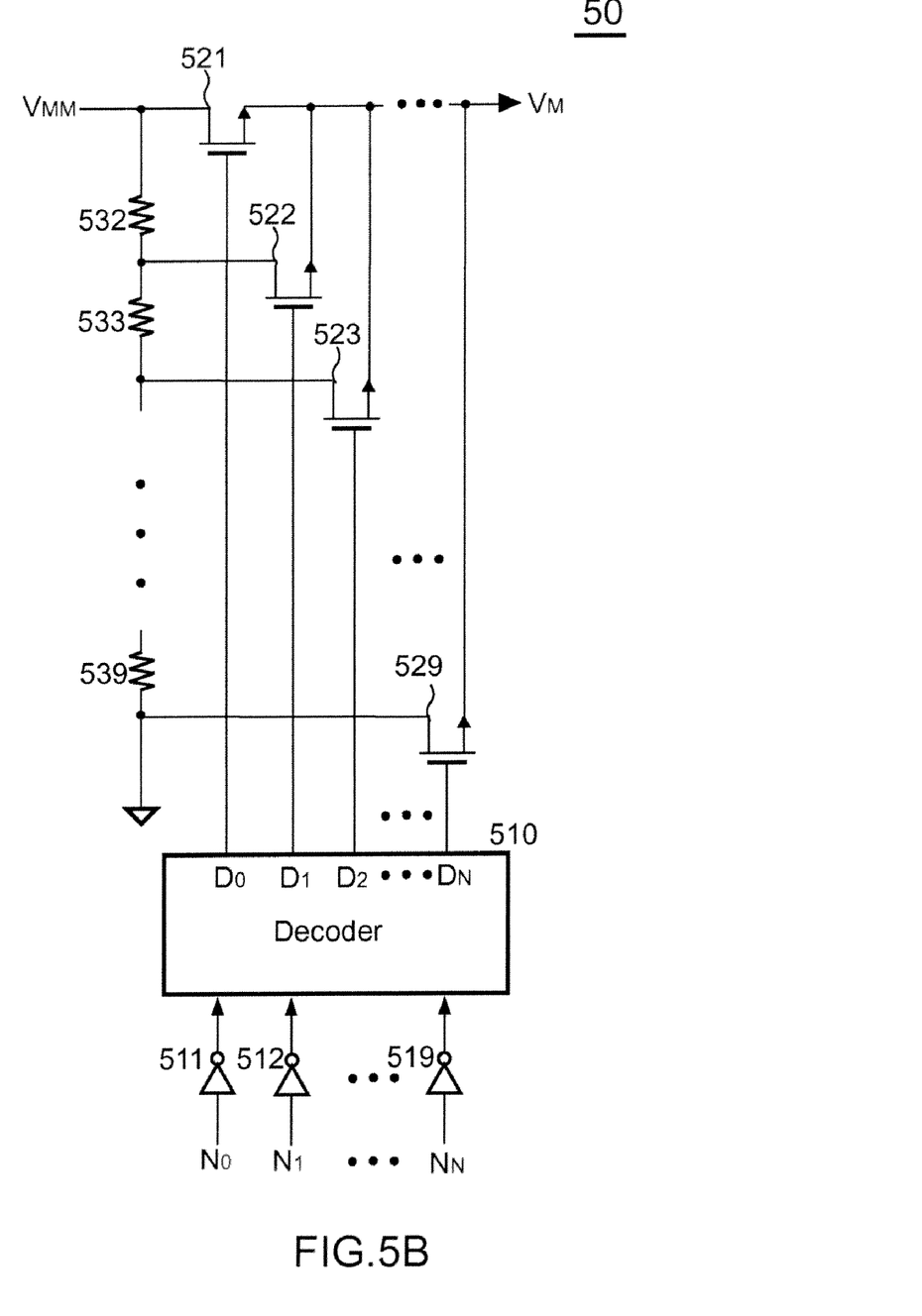
FIG. 5B shows a schematic circuit diagram of a embodiment of a reference adjustment unit according to the present invention.

FIG. 5A and FIG. 5B show schematic circuit diagrams of the slave reference signal generator 3. Referring to FIG. 5A, the load detector 10 includes a current source $I_B$, resistance components 120 and 130, comparators 140 and 150, NAND gates 170, 180 and 160. The counter unit 30 includes a AND gate 320 and an Up/Down counter 310. The current adjustment unit 40 includes a plurality of current sources 410~490 and a plurality of switches $S_1 \sim S_N$. The magnitude of the current sources 410~490 can be proportion. The hysteresis rage of light load is limited by a first threshold signal $V_{T1}$ and a second threshold signal $V_{T2}$ of the load detector 10, wherein the first threshold signal $V_{T1}$ is greater than the second threshold signal $V_{T2}$.

Referring to FIG. 5B, the reference adjustment unit 50 includes a decoder 510, a plurality of NOT gates 511~519, a plurality of switches 521~529 and a plurality of resistance components 532~539. The resistance components 532~539 are connected in series to form a voltage divider. The voltage divider is utilized to divide the control signal $V_{MM}$ for adjusting the control signal $V_{MM}$ and then generating the slave control signal $V_M$. The resistance values of the resistance components 532~539 can be proportion. The switches 521~529 are respectively coupled to the resistance components 532~539. The switches 521~529 are controlled by the decoder 510 to control the output of the slave control signal $V_M$.

Referring to FIG. 5A and FIG. 5B together. The error signal $V_{EA}$ received by the load detector 10 correlates to the load. When the load gets lighter, the error signal $V_{EA}$ will get smaller correspondingly. When the error signal $V_{EA}$ is smaller than the initial value of the second threshold signal $V_{T2}$, it means that the load is in the predetermined hysteresis range of the light load. When the load is in the predetermined hysteresis range of the light load, the load detector 10 will generate the Hold signal and the Mode signal. The level of the Hold signal is high and the level of the Mode signal is low. The counter unit 30 executes the down count in response to the high-level Hold signal and the low-level Mode signal and correspondingly generates the counter signals $N_0 \sim N_N$ of the down count. The current adjustment unit 40 will correspondingly control the switches $S_1 \sim S_N$ to turn on or turn off in response to the counter signals $N_0 \sim N_N$ of the down count to adjust the adjustment current $I_L$ (the adjustment current $I_L$ is reduced). The first threshold signal $V_{T1}$ and the second threshold signal $V_{T2}$ also correspondingly are adjusted in response to the current $I_L$. The load detector 10 will further adjust the levels of the Mode signal and the Hold signal in response to the error signal $V_{EA}$, the adjusted first threshold signal $V_{T1}$ and the adjusted second threshold signal $V_{T2}$.

Simultaneously, when the error signal $V_{EA}$ is smaller than the second threshold signal $V_{T2}$, the decoder 510 of the reference adjustment unit 50 (shown in FIG. 5B) receives the counter signals $N_0 \sim N_N$ of the down count through the NOT gates 511~519, and correspondingly generates decoding signals $D_0 \sim D_N$. The decoding signals $D_0 \sim D_N$ correspondingly controls the switches 521, 522 . . . or 529. That is, the reference adjustment unit 50 will correspondingly controls the switches 521, 522 . . . or 529 in response to the counter signal $N_0 \sim N_N$ of the down count. When the switches 521, 522 . . . or 529 is controlled to be turned on, the control signal $V_{MM}$ will correspondingly reduce in response to the resistance components 532, 533 . . . or 539 coupled to the switches 521, 522 . . . or 529 for generating the slave control signal $V_M$. Therefore, the slave switching control circuit 2 shown in FIG. 3 will control the second switch $Q_2$ (shown in FIG. 1) to reduce switching gradually in response to the slave control signal $V_M$.

The resistance values of the resistance components 532~539 correlate to the proportion of the reducing of the switching frequency of the second switch $Q_2$. When the switch 529 is controlled to be turned on, the slave control signal $V_M$ is zero and the second switch $Q_2$ will be turned off. Thus, the present invention can effectively reduce the switching loss of the second switch $Q_2$ to promote the efficacy increasing.

Referring to FIG. 5A again, the negative input terminal and the positive input terminal of the comparator 140 respectively receive the error signal $V_{EA}$ and the first threshold signal $V_{T1}$. The output terminal of the comparator 140 generates a signal $V_H$. Further, the error signal $V_{EA}$ is coupled to the positive input terminal of the comparator 150. The negative input terminal of the comparator 150 receives the second threshold signal $V_{T2}$. The output terminal of the comparator 150 generates a signal $V_L$. The first input terminal of the NAND gate 170 is coupled to the output terminal of the comparator 140 to receive the signal $V_H$. The output terminal of the NAND gate 170 generates the Mode signal. The first input terminal of the NAND gate 180 is coupled to the output terminal of the comparator 150 to receive the signal $V_L$. The second input terminal of the NAND gate 180 is coupled to the output terminal of the NAND gate 170 to receive the Mode signal. The output terminal of the NAND gate 180 is coupled to the second input terminal of the NAND gate 170. In addition, the two input terminals of the NAND gate 160 are respectively coupled to the output terminals of the comparator 140 and the comparator 150 to receive the signal $V_H$ and the signal $V_L$. The output terminal of the NAND gate 160 generates the Hold signal. The hysteresis range of the light load is limited by the first threshold signal $V_{T1}$ and the second threshold signal $V_{T2}$. The initial values of the first threshold signal $V_{T1}$ and the second threshold signal $V_{T2}$ can be programmed by the magnitude of the current of the current source $I_B$ and by the resistance values of the resistance components 120 and 130. The resistance components 120 and 130 are connected in series.

The current source $I_B$ is coupled in between the input power $V_{CC}$ and the resistance component 120. The positive input terminal of the comparator 140 is coupled to the joint point of the current source $I_B$ and the resistance component 120 to receive the first threshold signal $V_{T1}$. The negative input terminal of the comparator 150 is coupled to the joint point of the resistance component 120 and the resistance component 130 to receive the second threshold signal $V_{T2}$. The adjustment current $I_L$ is coupled to the joint point of the resistance component 120 and the resistance component 130. Therefore, the first threshold signal $V_{T1}$ and the second threshold signal $V_{T2}$ will be adjusted in response to the magnitude of the adjustment current $I_L$. The adjustment current $I_L$ will be adjusted in response to the load. The magnitude of the adjustment current $I_L$ is the sum of the outputs of the current sources 410~490 controlled by the switches $S_1$~$S_N$. The two terminals of each current sources 410~490 are coupled to the input power $V_{CC}$ and a terminal of the corresponding switches $S_1$~$S_N$. The other terminals of the switches $S_1$~$S_N$ are coupled to the joint point of the resistance components 120 and 130.

Referring to FIG. 5A again, when the error signal $V_{EA}$ is between the first threshold signal $V_{T1}$ and the second threshold signal $V_{T2}$ (not in the hysteresis range of the light road), the signal $V_H$ and the signal $V_L$ generated by the comparators 140 and 150 are all high-level. The Hold signal generated by the NAND gate 160 and the output from the output terminal of the AND gate 320 are all low-level. When the clock terminal of the up/down counter 310 receives the low-level signal, the up/down counter 310 doesn't execute the counting and the counter signals $N_0$~$N_N$ remains high-level. Meanwhile, the switches $S_1$~$S_N$ of the current adjustment unit 40 will be controlled by the counter signals $N_0$~$N_N$ and turned on; the adjustment current $I_L$ is a maximum value (the sum of the current sources 410~490).

Simultaneously, the decoder 510 of the reference adjustment unit 50 (as shown in FIG. 5B) receives the counter signals $N_0$~$N_N$ through the NOT gates 511~519, and correspondingly generates the decoding signals $D_0$~$D_N$ used to turn on the switch 521 in response to the low-level counter signals $N_0$~$N_N$ that are inverted by the NOT gates 511~519. The rest of the switches 522~529 are turned off When the switch 521 is turned on and the rest of the switches 522~529 are turned off, the slave control signal $V_M$ is equivalent to the control signal $V_{MM}$. When the slave control signal $V_M$ is equivalent to the control signal $V_{MM}$, the switching frequencies of the switches $Q_1$ and $Q_2$ (as shown in FIG. 1) are the same. The master switching control circuit 1 and the slave switching control circuit 2 control a half of the output power respectively.

Moreover, when the load gets lighter and the error signal $V_{EA}$ is smaller than the initial second threshold signal $V_{T2}$ so as to be in the predetermined hysteresis range of the light load, the signal $V_H$ and the signal $V_L$ respectively generated by the comparators 140 and 150 are high-level and low-level. Therefore, the NAND gate 160 outputs the Hold signal that is high-level. The level of the output from the output terminal of the AND gate 320 accords to the level of the clock signal CLK received by the AND gate 320. When the first input terminal of the NAND gate 170 and the first input terminal of the NAND gate 180 respectively receive the signal $V_H$ and the signal $V_L$ that the signal $V_H$ and signal $V_L$ are high-level and low-level respectively, the output terminal of the NAND gate 170 generates the Mode signal that is low-level.

When the Mode terminal MODE of the up/down counter 310 receives the low-level Mode signal, it executes the down count and generates the counter signals $N_0$~$N_N$ of the down count. When the up/down counter 310 executes the down count, the counter signals $N_0$~$N_N$ of the down count will control the switches $S_1$~$S_N$ to turn on or turn off in turn. The adjustment current $I_L$ is controlled by the switches $S_1$~$S_N$ and gradually reduces in response to the up/down counter 310 executing the down count. Therefore, the first threshold signal $V_{T1}$ and the second threshold signal $V_{T2}$ will be getting smaller in response to the reduction of the adjustment current $I_L$.

Simultaneously, the reference adjustment unit 50 (as shown in FIG. 5B) generates the decoding signal $D_0$~$D_N$ used to turn on the switches 521, 522 . . . or 529 in response to the counter signals $N_0$~$N_N$ of the down count. When the switches 521, 522 . . . or 529 are controlled to turn on in turn, the slave control signal $V_M$ will gradually get smaller. The slave switching control circuit 2 (as shown in FIG. 3) will control the second switch $Q_2$ (as shown in FIG. 1) to reduce gradually switching frequency for increasing efficacy. When the switch 529 is turned on, the slave control signal $V_M$ is zero and the second switching signal SW2 generated by the slave switching control circuit 2 is low-level. Therefore, the second switch $Q_2$ controlled by the second switching signal SW2 will be turned off to reduce effectively the switching loss and increase efficacy.

Besides, when the error signal $V_{EA}$ is in the predetermined hysteresis range of the light load and the load increases and the error signal $V_{EA}$ is greater than the first threshold $V_{T1}$, the signal $V_H$ and the signal $V_L$ generated by the comparators 140 and 150 are low-level and high-level respectively. Therefore, the NAND gate 160 outputs the Hold signal that is high-level. The output level of the output terminal of the AND gate 320 corresponds to the level of the clock signal CLK. When the first input terminal of the NAND gate 170 receives the low-level signal $V_H$, its output terminal generates the Mode signal that is high-level.

When the Mode terminal MODE of the up/down counter 310 receives the high-level Mode signal, the up/down counter 310 executes the up-count and generates the counter signals $N_0 \sim N_N$ of the up count. When the up/down counter 310 executes the up count, the counter signals $N_0 \sim N_N$ of the up count control the switches $S_1 \sim S_N$ to turn on or turned off in turn. The adjustment current $I_L$ will be controlled by the switches $S_1 \sim S_N$ and gradually increase in response to the up count. Therefore, the first threshold signal $V_{T1}$ and the second threshold $V_{T2}$ will increase in response to the increase of the adjustment current $I_L$. Simultaneously, the reference adjustment unit 50 (as shown in FIG. 5B) correspondingly generates the decoding signals $D_0 \sim D_N$ in response to the counter signals $N_0 \sim N_N$ of the up count. The decoding signals $D_0 \sim D_N$ are used to control respectively the switches 521, 522 . . . or 529 to turn on to control the slave control signal $V_m$ to increase gradually. The second switch $Q_2$ (as shown in FIG. 1) controlled by the slave switching control circuit 2 (as shown in FIG. 3) will increase the switching frequency to react the load condition.

Figure 6:
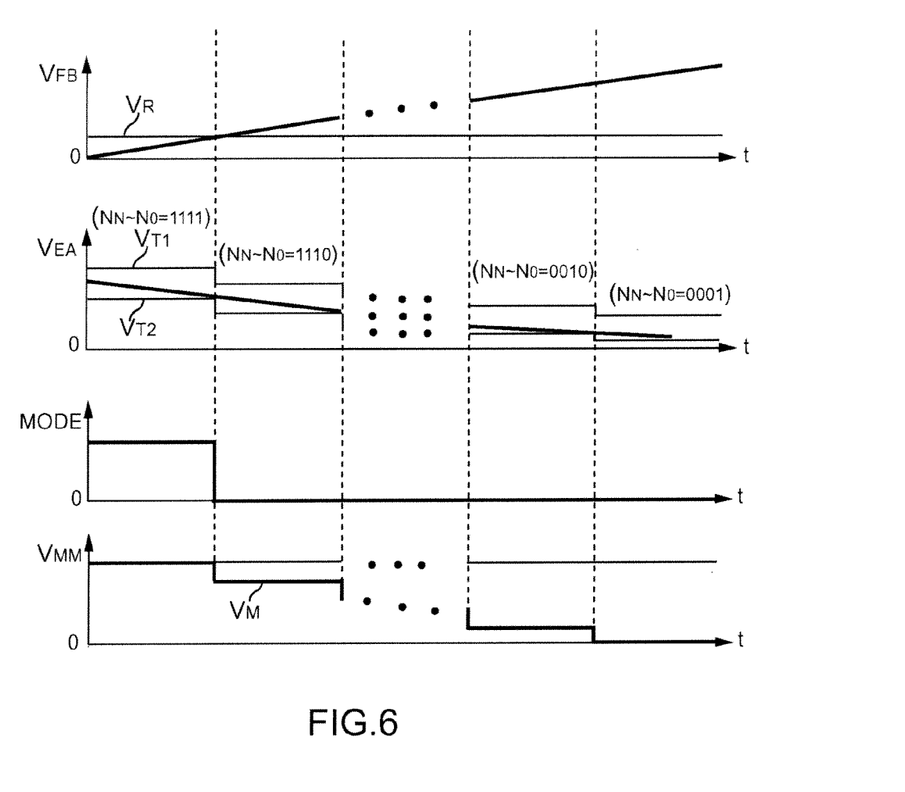
FIG. 6 shows a waveform diagram of a embodiment of the control circuit according to the present invention.

FIG. 6 shows a waveform diagram of the control circuit according to the present invention. When the load is not in the predetermined hysteresis range of the light load, the feedback signal $V_{FB}$ is smaller than the reference signal $V_R$. Therefore, the error signal $V_{EA}$ received by the load detector 10 (as shown in FIG. 4) is between the first threshold signal $V_{T1}$ and the second threshold signal $V_{T2}$. Meanwhile, the load detector 10 will output the Mode signal and the Hold signal (not shown in FIG. 6) that are high-level and low-level respectively. The counter unit 30 will output the counter signals $N_0 \sim N_N$ that are high-level, and the slave control signal $V_M$ generated by the reference adjustment unit 50 is the same as the control signal $V_{MM}$.

Further, when the load is in the predetermined hysteresis range of the light load, the feedback signal $V_{FB}$ is greater than the reference signal $V_R$. Meanwhile, the error signal $V_{EA}$ received by the load detector 10 is smaller than the second threshold signal $V_{T2}$. The load detector 10 will output the Mode signal and the Hold signal (not shown in FIG. 6) that are low-level and high-level respectively. Meanwhile, the counter unit 30 will output the counter signals $N_0 \sim N_N$ of the down count. The reference adjustment unit 50 correspondingly generates the slave control signal $V_M$ that is decreased gradually in response to the counter signals $N_0 \sim N_N$ of the down count. When the load is getting light gradually, the counter signals $N_0 \sim N_N$ will gradually be executed the down count to control respectively the switches 521, 522 . . . or 529 to turn on or turn off. When the counter unit 30 executes the down count lastly and correspondingly generates the counter signals $N_0 \sim N_N$ to turn on the switch 529 of the reference adjustment unit 50, the slave control signal $V_M$ is zero. At this moment, the second switch $Q_2$ controlled by the second switching signal SW2 will be turned off to reduce the switching loss effectively and to increase efficacy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit of an interleaved PFC power converter comprising:
    a master switching control circuit, generating a first switching signal and a control signal in response to an input voltage and a feedback signal, the first switching signal controlling a first switch of the interleaved PFC power converter;
    a slave reference signal generator, generating a slave control signal in response to a load condition of the interleaved PFC power converter and the control signal; and
    a slave switching control circuit, generating a second switching signal in response to the slave control signal to control a second switch of the interleaved PFC power converter.

2. The control circuit as claimed in claim 1, wherein the slave reference signal generator comprises:
    a load detector, detecting the load condition to generate a detection signal;
    a counter unit, coupled to the load detector to generate a counter signal in response to the detection signal;
    a current adjustment unit, coupled to the counter unit to adjust an adjustment current in response to the counter signal; and
    a reference adjustment unit, coupled to the counter unit and adjusting the control signal in response to the counter signal to generate the slave control signal;
    wherein the load detector generates the detection signal in response to the adjustment current and the load condition.

3. The control circuit as claimed in claim 2, wherein the load detector detects the load condition and generates the detection signal in response to an error signal; when the error signal is smaller than a second threshold signal of the load detector, the detection signal drives the counter unit to execute the down count and correspondingly generate the counter signal, the reference adjustment unit correspondingly gradually reduces the slave control signal in response to the counter signal.

4. The control circuit as claimed in claim 3, wherein the current adjustment unit gradually reduces the adjustment current in response to the counter signal of the down count, the load detector adjusts the second threshold signal and a first threshold signal in response to the adjustment current, and adjusts the detection signal in response to the error signal and the adjusted first threshold signal and the adjusted second threshold signal, wherein the first threshold signal is greater than the second threshold signal.

5. The control circuit as claimed in claim 3, wherein the counter unit executes the down count lastly and correspondingly generates the counter signal to control the reference adjustment unit to adjust the slave control signal to zero for turning off the second switch of the interleaved PFC power converter.

6. The control circuit as claimed in claim 2, wherein the load detector detects the load condition and generates the detection signal in response to an error signal; when the error signal is greater than a first threshold signal of the load detector, the detection signal drives the counter unit to execute the up count and correspondingly generates the counter signal, the reference adjustment unit correspondingly gradually increases the slave control signal in response to the counter signal.

7. The control circuit as claimed in claim 6, wherein the current adjustment unit gradually increases the adjustment current in response to the counter signal of the up count, the load detector adjusts the first threshold signal and a second threshold signal in response to the adjustment current, and adjusts the detection signal in response to the error signal and the adjusted first threshold signal and the adjusted second threshold signal, the first threshold signal is greater than the second threshold signal.

8. The control circuit as claimed in claim 2, wherein when the error signal is between a first threshold signal and a second threshold signal of the load detector, the counter unit does not execute the counting in response to the detection signal, the reference adjustment unit does not adjust the control signal that is equivalent to the slave control signal.

9. The control circuit as claimed in claim 2, wherein the current adjustment unit comprises:
   a plurality of current sources; and
   a plurality of switches, respectively coupled between the current sources and the load detector and controlled by the counter signal to adjust the adjustment current.

10. The control circuit as claimed in claim 2, wherein the reference adjustment unit comprises:
   a plurality of resistance components, connected in series and coupled to the control signal to adjust the control signal for generating the slave control signal;
   a plurality of switches, respectively coupled to the resistance components to control the output of the slave control signal; and
   a decoder, generating a decoding signal in response to the counter signal to control the switches.

11. The control circuit as claimed in claim 2, wherein the detection signal comprises a Mode signal and a Hold signal.

* * * * *